United States Patent
Sewall et al.

(10) Patent No.: US 9,237,102 B2
(45) Date of Patent: Jan. 12, 2016

(54) SELECTING A DATA PATH

(75) Inventors: Patrick Sewall, Boise, ID (US); David Alan Johnson, Boise, ID (US); Steven Wood, Boise, ID (US)

(73) Assignee: CRADLEPOINT, INC., Boise, ID (US)

( * ) Notice: Subject to any disclaimer, the term of this patent is extended or adjusted under 35 U.S.C. 154(b) by 0 days.

(21) Appl. No.: 12/350,407

(22) Filed: Jan. 8, 2009

(65) Prior Publication Data

US 2009/0175285 A1    Jul. 9, 2009

Related U.S. Application Data (63) Continuation-in-part of application No. 10/936,124, filed on Sep. 8, 2004.

(60) Provisional application No. 61/019,874, filed on Jan. 9, 2008.

(51) Int. Cl.
    *H04L 12/801*      (2013.01)
    *H04L 12/715*      (2013.01)
    *H04L 12/725*      (2013.01)

(52) U.S. Cl.
    CPC ............... *H04L 47/10* (2013.01); *H04L 45/04* (2013.01); *H04L 45/308* (2013.01)

(58) Field of Classification Search
    USPC ......... 370/230, 338, 339, 341, 349, 356, 389, 370/392, 395.52, 902; 709/219, 227; 455/552.1, 557
See application file for complete search history.

(56) References Cited

U.S. PATENT DOCUMENTS

| | | | |
|---|---|---|---|
| 5,231,633 A | 7/1993 | Hluchyj et al. | |
| 5,594,946 A | 1/1997 | Menich et al. | |
| 5,638,359 A | 6/1997 | Peltola et al. | |
| 5,859,628 A | 1/1999 | Ross et al. | |
| 5,864,539 A | 1/1999 | Yin | |
| 6,006,034 A | 12/1999 | Heath et al. | |
| 6,006,264 A * | 12/1999 | Colby et al. | 709/226 |
| 6,028,848 A | 2/2000 | Bhatia et al. | |
| 6,031,844 A | 2/2000 | Lin | |
| 6,377,825 B1 | 4/2002 | Kennedy et al. | |
| 6,389,462 B1 | 5/2002 | Cohen et al. | |
| 6,434,187 B1 | 8/2002 | Beard et al. | |

(Continued)

FOREIGN PATENT DOCUMENTS

| | | |
|---|---|---|
| JP | 20010186565 | 7/2001 |
| KR | 20040028099 | 4/2004 |

OTHER PUBLICATIONS

USPTO, "Final Office Action in U.S. Appl. No. 10/936,124.", Feb. 2, 2007.

(Continued)

*Primary Examiner* — Hassan Phillips
*Assistant Examiner* — Mark A Mais
(74) *Attorney, Agent, or Firm* — Parsons Behle & Latimer (57) ABSTRACT

A method for selecting a data path includes identifying a plurality of available data paths between a router device and a wide area network. Link status information for the available data paths are obtained. Selection rules are processed with the obtained link status information, and one of the plurality of available data paths is selected according to the processing of the selection rules. Data communications are then routed between a local area network and the wide area network via a data exchanger and a remote data link that follows the selected data path.

21 Claims, 4 Drawing Sheets

(56) References Cited

U.S. PATENT DOCUMENTS

| | | | |
|---|---|---|---|
| 6,535,592 B1* | 3/2003 | Snelgrove | 379/114.07 |
| 6,560,442 B1 | 5/2003 | Yost et al. | |
| 6,609,197 B1 | 8/2003 | Ketcham et al. | |
| 6,611,861 B1 | 8/2003 | Schairer et al. | |
| 6,615,262 B2 | 9/2003 | Schweitzer et al. | |
| 6,621,798 B1 | 9/2003 | Krishnan et al. | |
| 6,735,447 B1 | 5/2004 | Muller | |
| 6,795,700 B2* | 9/2004 | Karaoguz et al. | 455/408 |
| 6,850,495 B1 | 2/2005 | Baum et al. | |
| 6,862,444 B2* | 3/2005 | Karaoguz et al. | 455/408 |
| 6,885,859 B2* | 4/2005 | Karaoguz et al. | 455/408 |
| 6,967,958 B2 | 11/2005 | Ono et al. | |
| 6,987,726 B1 | 1/2006 | Elliott | |
| 7,009,941 B1 | 3/2006 | Uchino | |
| 7,095,335 B2 | 8/2006 | De Bolster et al. | |
| 7,187,923 B2* | 3/2007 | Mousseau et al. | 455/416 |
| 7,213,478 B2 | 5/2007 | Harada et al. | |
| 7,317,896 B1 | 1/2008 | Saxena et al. | |
| 7,346,344 B2 | 3/2008 | Fontaine | |
| 7,382,771 B2 | 6/2008 | Leblanc et al. | |
| 7,400,903 B2* | 7/2008 | Shoemake et al. | 455/552.1 |
| 7,421,265 B1 | 9/2008 | Liu | |
| 7,558,199 B1 | 7/2009 | Minei | |
| 7,617,317 B2* | 11/2009 | Jones et al. | 709/227 |
| 7,620,065 B2* | 11/2009 | Falardeau | 370/465 |
| 7,675,862 B2 | 3/2010 | Pham et al. | |
| 7,764,784 B2 | 7/2010 | Sewall | |
| 7,813,314 B2* | 10/2010 | Fulknier et al. | 370/328 |
| 8,046,000 B2* | 10/2011 | Sylvain | 455/456.3 |
| 8,077,681 B2* | 12/2011 | Ahmavaara et al. | 370/338 |
| 8,090,807 B2* | 1/2012 | Chung et al. | 709/222 |
| 8,126,145 B1 | 2/2012 | Tewari et al. | |
| 2001/0039580 A1 | 11/2001 | Walker et al. | |
| 2001/0042215 A1 | 11/2001 | Sullivan et al. | |
| 2001/0046870 A1 | 11/2001 | Stilp et al. | |
| 2002/0025832 A1 | 2/2002 | Durian et al. | |
| 2002/0062372 A1 | 5/2002 | Hong et al. | |
| 2002/0118663 A1 | 8/2002 | Dorenbosch et al. | |
| 2003/0037165 A1 | 2/2003 | Shinomiya | |
| 2003/0043755 A1 | 3/2003 | Mitchell | |
| 2003/0045295 A1 | 3/2003 | Stanforth | |
| 2003/0046396 A1 | 3/2003 | Richter et al. | |
| 2003/0059005 A1 | 3/2003 | Meyerson et al. | |
| 2003/0126252 A1 | 7/2003 | Abir | |
| 2003/0200308 A1 | 10/2003 | Tameda et al. | |
| 2003/0212800 A1 | 11/2003 | Jones et al. | |
| 2003/0235175 A1 | 12/2003 | Naghian et al. | |
| 2004/0003071 A1 | 1/2004 | Mathew et al. | |
| 2004/0038697 A1 | 2/2004 | Attar et al. | |
| 2004/0049576 A1 | 3/2004 | Schweitzer et al. | |
| 2004/0110544 A1 | 6/2004 | Oyagi et al. | |
| 2004/0133689 A1 | 7/2004 | Vasisht | |
| 2004/0133793 A1 | 7/2004 | Ginter et al. | |
| 2004/0139170 A1 | 7/2004 | Shen et al. | |
| 2004/0152449 A1 | 8/2004 | Koshihara | |
| 2004/0153676 A1 | 8/2004 | Krantz et al. | |
| 2004/0185876 A1 | 9/2004 | Groenendaal et al. | |
| 2004/0205154 A1 | 10/2004 | Dalton et al. | |
| 2004/0205155 A1 | 10/2004 | Nobakht et al. | |
| 2004/0218544 A1 | 11/2004 | Lee | |
| 2004/0250136 A1 | 12/2004 | Albertine Trappeniers et al. | |
| 2005/0008017 A1 | 1/2005 | Datta et al. | |
| 2005/0014525 A1 | 1/2005 | Tsunehara et al. | |
| 2005/0022013 A1 | 1/2005 | Schwenk | |
| 2005/0038905 A1 | 2/2005 | Banes et al. | |
| 2005/0044235 A1 | 2/2005 | Balahura | |
| 2005/0047326 A1 | 3/2005 | Puon et al. | |
| 2005/0086346 A1 | 4/2005 | Meyer | |
| 2005/0101340 A1 | 5/2005 | Archiable | |
| 2005/0108573 A1 | 5/2005 | Bennett et al. | |
| 2005/0198234 A1 | 9/2005 | Leib et al. | |
| 2005/0198319 A1 | 9/2005 | Chan et al. | |
| 2005/0221850 A1 | 10/2005 | Kashiwase | |
| 2005/0233728 A1* | 10/2005 | Karaoguz et al. | 455/406 |
| 2005/0245233 A1 | 11/2005 | Anderson | |
| 2005/0246434 A1 | 11/2005 | Bantz et al. | |
| 2005/0259645 A1 | 11/2005 | Chen et al. | |
| 2005/0259654 A1 | 11/2005 | Faulk | |
| 2005/0262248 A1 | 11/2005 | Jennings, III et al. | |
| 2005/0267965 A1 | 12/2005 | Heller | |
| 2006/0047823 A1 | 3/2006 | Cheng | |
| 2006/0072474 A1 | 4/2006 | Mitchell | |
| 2006/0077607 A1 | 4/2006 | Henricks et al. | |
| 2006/0133582 A1 | 6/2006 | McCulloch | |
| 2006/0153216 A1 | 7/2006 | Hosein et al. | |
| 2006/0171402 A1 | 8/2006 | Moore et al. | |
| 2006/0184670 A1 | 8/2006 | Beeson et al. | |
| 2006/0187890 A1 | 8/2006 | Lin | |
| 2007/0002846 A1* | 1/2007 | Rada et al. | 370/358 |
| 2007/0030857 A1 | 2/2007 | Fulknier et al. | |
| 2007/0081469 A1 | 4/2007 | Tracy et al. | |
| 2007/0083606 A1 | 4/2007 | Malik et al. | |
| 2007/0147324 A1 | 6/2007 | McGary | |
| 2007/0153689 A1 | 7/2007 | Strub et al. | |
| 2007/0177555 A1 | 8/2007 | Brueck | |
| 2007/0233879 A1 | 10/2007 | Woods et al. | |
| 2007/0254727 A1 | 11/2007 | Sewall | |
| 2007/0255848 A1 | 11/2007 | Sewall | |
| 2007/0291711 A1 | 12/2007 | Welch et al. | |
| 2008/0005108 A1 | 1/2008 | Ozzie et al. | |
| 2008/0008165 A1 | 1/2008 | Ikeda et al. | |
| 2008/0039102 A1 | 2/2008 | Sewall | |
| 2008/0043626 A1 | 2/2008 | Pham et al. | |
| 2008/0043673 A1 | 2/2008 | Johnson et al. | |
| 2008/0046561 A1 | 2/2008 | Pham et al. | |
| 2008/0049630 A1 | 2/2008 | Kozisek et al. | |
| 2008/0056222 A1 | 3/2008 | Waites | |
| 2008/0117860 A1 | 5/2008 | Rodriguez et al. | |
| 2008/0159167 A1 | 7/2008 | Ito et al. | |
| 2008/0178172 A1 | 7/2008 | Dossa et al. | |
| 2008/0259841 A1 | 10/2008 | Deshpande | |
| 2008/0310407 A1 | 12/2008 | Sewall | |
| 2008/0313327 A1 | 12/2008 | Sewall et al. | |
| 2009/0007096 A1 | 1/2009 | Chavez et al. | |
| 2009/0015419 A1 | 1/2009 | Sewall | |
| 2009/0030908 A1 | 1/2009 | Kawabe | |
| 2009/0063667 A1 | 3/2009 | Smith et al. | |
| 2009/0109959 A1 | 4/2009 | Elliott et al. | |
| 2009/0129319 A1 | 5/2009 | Buddhikot et al. | |
| 2009/0138447 A1 | 5/2009 | Kalavade | |
| 2009/0147700 A1 | 6/2009 | Sewall | |
| 2009/0168789 A1 | 7/2009 | Wood | |
| 2009/0172658 A1 | 7/2009 | Wood | |
| 2009/0172796 A1 | 7/2009 | Wood | |
| 2009/0175285 A1 | 7/2009 | Wood et al. | |
| 2009/0180395 A1 | 7/2009 | Wood et al. | |
| 2009/0182845 A1 | 7/2009 | Johnson | |
| 2009/0207003 A1 | 8/2009 | Brekke et al. | |
| 2010/0014415 A1 | 1/2010 | Moeller | |
| 2010/0118846 A1 | 5/2010 | Moeller | |
| 2010/0202450 A1 | 8/2010 | Ansari et al. | |
| 2010/0231790 A1 | 9/2010 | Ansari et al. | |
| 2011/0051703 A1 | 3/2011 | Fulknier et al. | |
| 2011/0167157 A1 | 7/2011 | Virgilio et al. | |
| 2011/0199932 A1 | 8/2011 | Short et al. | |

OTHER PUBLICATIONS

USPTO, "Final Office Action in U.S. Appl. No. 10/936,124.", Feb. 9, 2009.

USPTO, "Final Office Action in U.S. Appl. No. 10/936,124.", Jul. 11, 2007.

USPTO, "Final Office Action in U.S. Appl. No. 10/936,124.", Sep. 3, 2009.

USPTO, "Office Action in U.S. Appl. No. 10/936,124.", Apr. 10, 2008.

USPTO, "Office Action in U.S. Appl. No. 10/936,124.", Jun. 26, 2006.

Webster's, "Router", Aug. 28, 2009, Publisher: Webster's New World Telcom Dictionary 2009, Your Dictionary, www.yourdictionary.com/telecom/router.

USPTO, "Final Office Action in U.S. Appl. No. 11/673,965.", Apr. 1, 2010.

(56) References Cited

OTHER PUBLICATIONS

USPTO, "Office Action in U.S. Appl. No. 11/673,965.", Sep. 2, 2009.
USPTO, "Advisory Action in U.S. Appl. No. 11/376,973", Mar. 19, 2010.
R. Elz, R. Bush, "RFC 2181 Clarifications to the DNS Specification, Internet Engineering Task Force, http://tools.ieff.org/html/r1c2181, 1 page", Jul. 1997.
P. Vixie, S. Thomson, Y. Rekhter, J. Bound, "RFC 2136 Dynamic Updates in the Domain Name System (DNS Update), Internet Engineering Task Force, 51 pages.", Apr. 1997.
USPTO, "Final Office Action in U.S. Appl. No. 11/673,973.", Dec. 10, 2009.
USPTO, "Office Action in U.S. Appl. No. 11/673,973.", May 28, 2009.
Wikipedia, "Proxy Server, http://en.wikipedia.org/wiki/Proxy_server ; 9 pages,", Apr. 12, 2010.
USPTO, "Final Office Action in U.S. Appl. No. 11/673,956.", Apr. 15, 2010.
USPTO, "Office Action in U.S. Appl. No. 11/673,956.", Sep. 2, 2009.
USPTO, "Office Action in U.S. Appl. No. 12/172,885.", Apr. 26, 2010.
PCT, "International Search Report & Written Opinion of the International Searching Authority for Application No. PCT/US2007/062077,", Nov. 20, 2007.
PCT, "International Search Report & Written Opinion of the International Searching Authority for Application No. PCT/US2007/062078,", Mar. 5, 2008.
PCT, "International Search Report & Written Opinion of the International Searching Authority for Application No. PCT/US2007/062079,", Nov. 8, 2007.
PCT, "International Search Report and Written Opinion of the International Searching Authority for Application No. PCT/US2008/076836,", Mar. 6, 2009.
PCT, "International Search Report and Written Opinion of the International Searching Authority for Application No. PCT/US2008/083409,", May 12, 2009.
USPTO, "Office Action in U.S. Appl. No. 11/673,973", Jun. 24, 2010.
USPTO, "Office Action in U.S. Appl. No. 12/172,862", Aug. 31, 2010.
USPTO, "Office Action in U.S. Appl. No. 11/673,965 dated Feb. 15, 2011".
USPTO, "Office Action in U.S. Appl. No. 12/172,862 dated Feb. 14, 2011".
USPTO, "Office Action in U.S. Appl. No. 11/673,956 dated Dec. 22, 2010".
USPTO, "Final Office Action in U.S. Appl. No. 12/172,885 dated Nov. 2, 2010".
In Motion Technology—Take Your Business on the Road—Mobile Hotspot, "In Motion Technology, Inc. Introduces Industry's First 3G Hotspot for Passenger Productivity.", Jul. 31, 2003, Publisher: http://www.inmotiontechnology.com/newsevents/carey.html.
Mikrotik, "MikroTik Router OS V28 Reference Manual", 2005.
Peng, Dar-Tzen; Shin, K.G.; Abdelzaher, T.F., "Assignment and scheduling communicating periodic tasks in distributed real-time systems", Dec. 1997, Publisher: Software Engineering, IEEE Transactions on, vol. 23, No. 12, pp. 745-758, Dec. 1997.
USPTO, "Office Action in U.S. Appl. No. 12/270,419 dated Dec. 17, 2010".
US Patent and Trademark Office, Office Action, U.S. Appl. No. 12/172,862, dated Jul. 27, 2011.
US Patent and Trademark Office, Final Office Action, U.S. Appl. No. 11/673.965, dated Aug. 4, 2011.
US Patent and Trademark Office, Office Action, U.S. Appl. No. 11/673,956, dated Aug. 10, 2011.
US Patent and Trademark Office, Final Office Action, U.S. Appl. No. 12/270,419, dated Jul. 11, 2011.
US Patent and Trademark Office, Office Action, U.S. Appl. No. 12/350,405, dated Feb. 16, 2012.
US Patent and Trademark Office, Final Office Action dated Mar. 15, 2012 for U.S. Appl. No. 12/843,541.
US Patent and Trademark Office, Office Action, U.S. Appl. No. 12/350,402, dated Apr. 16, 2012.
US Patent and Trademark Office; Office Action for U.S. Appl. No. 12/270,419 dated Mar. 27, 2012.
US Patent and Trademark Office, Final Office Action for U.S. Appl. No. 12/172,862 dated Apr. 24, 2012.
Router; http://www.yourdictionary.com/telecom/router; Aug. 28, 2009.
US Patent and Trademark Office, Office Action for U.S. Appl. No. 12/843,541 dated Jul. 18, 2012.
Office Action dated Sep. 23, 2014, issued in CA 2730490.
Office Action dated Sep. 24, 2014, issued in CA 2730483.
US Patent and Trademark Office, Office Action dated Sep. 12, 2012 for U.S. Appl. No. 12/350,460.
US Patent and Trademark Office, Office Action dated Mar. 14, 2013 for U.S. Appl. No. 12/172,862.
US Patent and Trademark Office, Office Action dated Apr. 10, 2013 for U.S. Appl. No. 12/351,502.
US Patent and Trademark Office, Office Action dated Jun. 6, 2013 for U.S. Appl. No. 12/350,405.

* cited by examiner

| LINK ID | LINK CHARACTERISTICS | | | |
|---|---|---|---|---|
| | TRANSFER RATE | SIGNAL STRENGTH | SECURITY | COST |
| ID(1) | RATE(1) | STRENGTH(1) | SECURITY(1) | COST(1) |
| ID(2) | RATE(2) | STRENGTH(2) | SECURITY(2) | COST(2) |
| ○○○ | ○○○ | ○○○ | ○○○ | ○○○ |
| ID(n) | RATE(n) | STRENGTH(n) | SECURITY(n) | COST(n) |

FIG. 5

| SELECTION RULES | |
|---|---|
| RULE | PRIORITY |
| RULE(1) | 1 |
| RULE(2) | 2 |
| ○○○ | ○○○ |
| RULE(n) | n |

FIG. 6

SELECTING A DATA PATH

CROSS REFERENCE TO RELATED APPLICATIONS

This application claims the priority of provisional applications 61/019,874 entitled "Intelligent Switching Between Multiple Available Wan Connections" filed Jan. 9, 2008. This application is a continuation in part of application Ser. No. 10/936,124 entitled Device Cradle filed Sep. 8, 2004.

BACKGROUND

Routers allow client devices in a local area network (LAN) to access a wide area network (WAN). Often, a router connects to the WAN via a data exchanger such as a data enabled cellular device, a DSL modem, or a cable modem. A given router may be equipped to simultaneously connect to multiple data exchangers. Each data exchanger is equipped to establish a data link with one or more service providers over which the router device can route data communications. Thus, at any given point a router device may be presented with multiple available data paths for accessing a WAN. The user, unfortunately, is not presented with

DETAILED DESCRIPTION

INTRODUCTION: Various embodiments described below operate to automatically select a data path for routing data communications between a router device and a wide area network (WAN) such as the internet. A given router device may be presented with multiple available paths for establishing data links with a various service providers. That router device can automatically select one of those available paths based on objective criteria such as data transfer costs and speeds.

Figure 1:
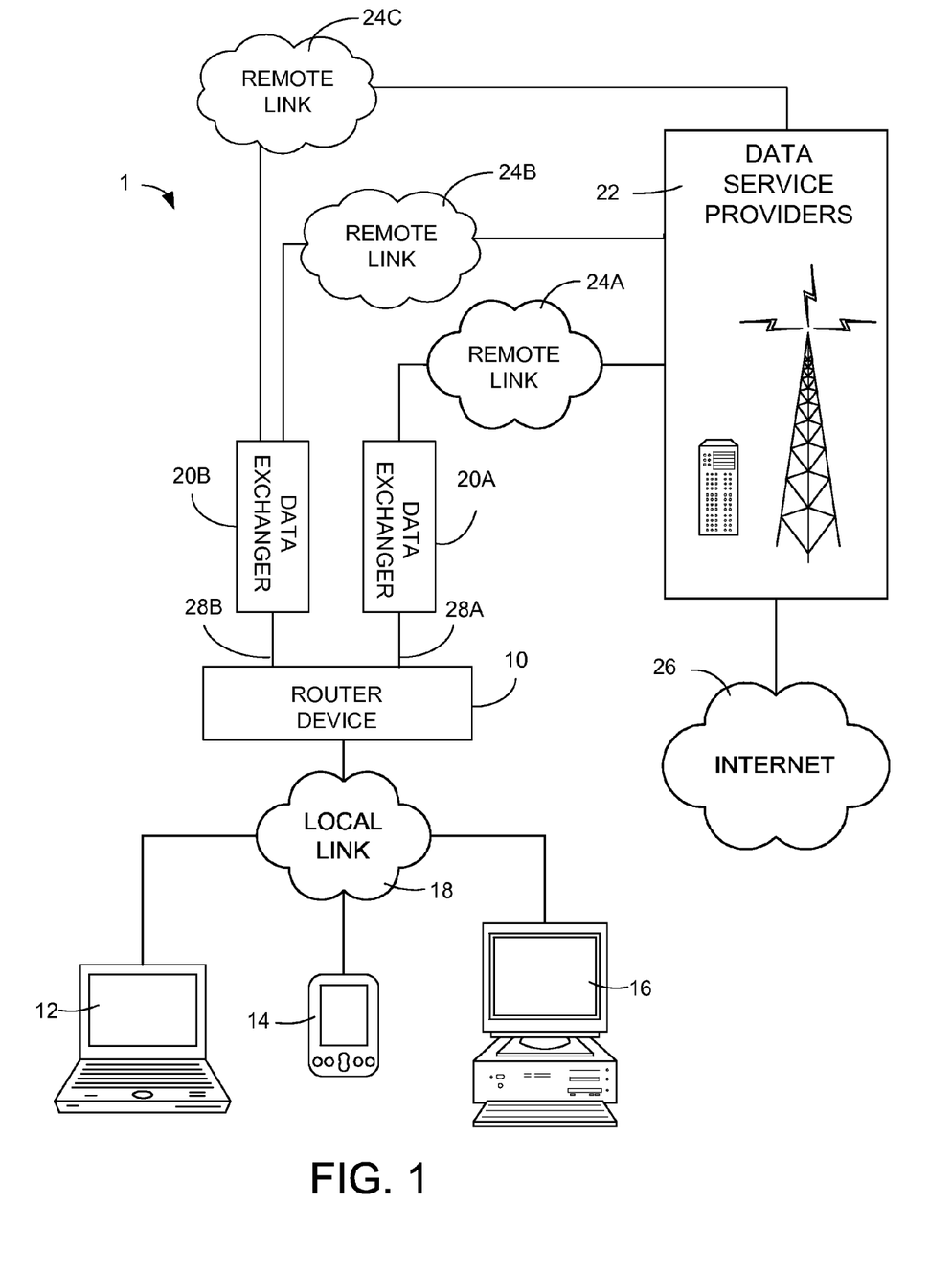
FIG. 1 illustrates an exemplary environment in which embodiments of the present invention can be implemented.

ENVIRONMENT: FIG. 1 illustrates exemplary environment 1 in which various embodiments of the present invention may be implemented. Environment 1 includes router device 10 and clients 12, 14, and 16 and local link 18. Clients 12, 14, and 16 represent generally any computing devices capable of communicating with router device 10. Router device 10, discussed in more detail later, represents generally a device capable of connecting to clients 12, 14, and 16 and performing one or more tasks as guided by a connected client.

Local link 18 interconnects router device 10 and clients 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchangers 20A, 20B and service providers 22. Each data exchanger 20A, 20B represents generally any combination of hardware and programming that can be utilized by router device 10 to connect to a wide area network (WAN) such as the internet. A given data exchanger 20A, 20B may, for example, take the form of a data capable cellular device such as a cell phone or card adapter, a DSL modem, a cable modem, or even a dial-up modem.

Service providers 22 represent generally infrastructure configured to provide internet related data services to subscribers such as an owner of data exchangers 20A, 20B. For example, where a given data exchanger 20A, 20B is a data enabled cellular telephone or card adapter, a corresponding service providers 22 may be a cellular telephone service provider capable of providing voice and data services to subscribers allowing access to internet 26. Where a given data exchanger 22A, 22B is a DSL or cable modem, a corresponding service providers 22 may include a more traditional internet service provider (ISP) providing data access to internet 26.

Remote links 24A, 24B, 24C are each a data link that interconnects a given data exchanger 20A, 20B and service provider 22. Each remote link 24A, 24B, 24C represents generally any combination of a cable, wireless, or remote connection via a telecommunication link, an infrared link, a radio frequency link, or any other connectors or systems that provides electronic communication between data exchanger 20 and service providers 22.

In the embodiment illustrated in environment 1, device links 28A, 28B interconnect router device 10 and data exchangers 20A, 20B. Each device link 28A, 28B represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying communications of any one of a number of protocols such as Bluetooth.

It is noted that one or both data exchangers 20A, 20B may be fully integrated into router device 10 or may be cards, dongles, or the like that plug into router device 10. Thus one or both device links 28A, 28B may include internal connections within router device 10. While FIG. 1 illustrates the existence of two data exchangers 20A, 20B, router device 10 may be configured to utilize any number of data exchangers.

Figure 2:
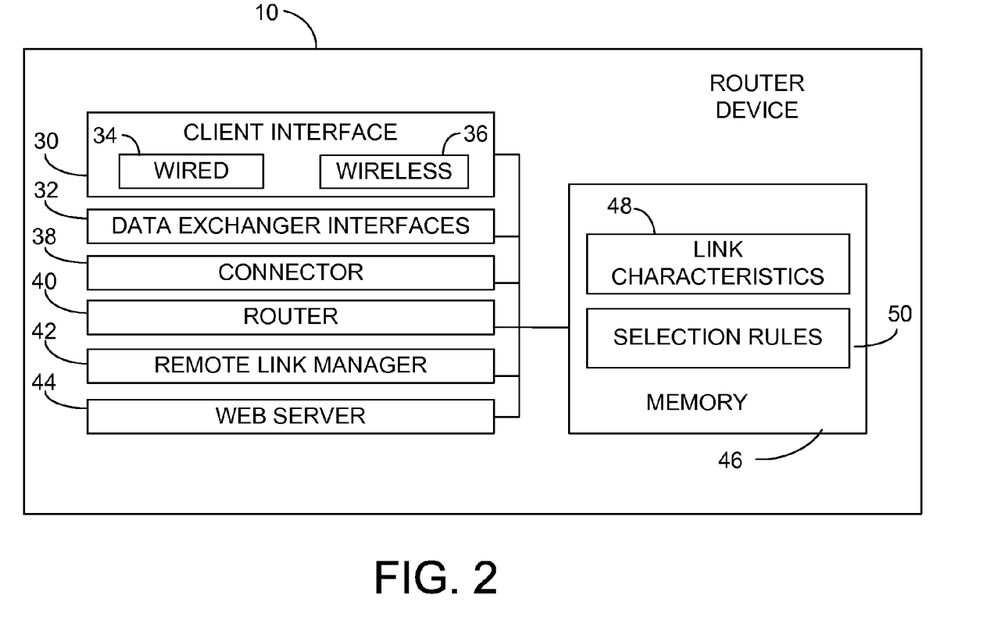
FIGS. 2-5 are block diagrams showing physical and logical components of a Router according to an embodiment of the present invention.
Figure 3:
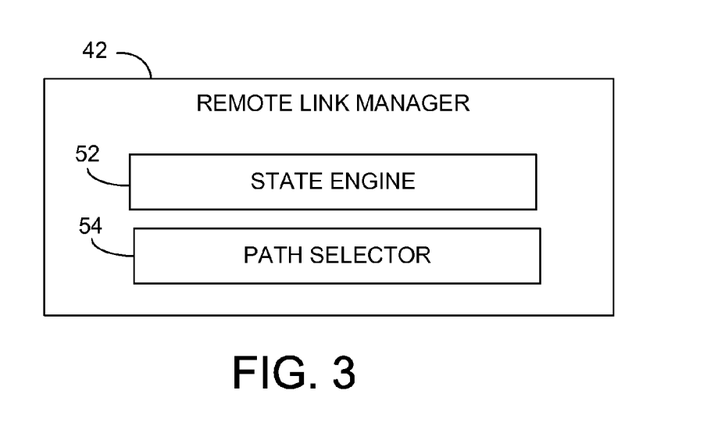

ROUTER DEVICE: FIG. 2 is a block diagram illustrating physical and logical components of router device 10. In this example, router device 10 represents generally any combination of hardware and programming capable routing network communications between clients on the local network and between the clients and a wide area network such as the internet via a selected one of a plurality of data exchangers. In the example of FIG. 3 router device 10 includes client interface 30 and data exchanger interfaces 32. Client interface 30 represents generally any combination of hardware and program instructions capable of supplying a communication interface between router device 10 and clients 12, 14, and 16 shown in FIG. 1.

Data exchanger interfaces 32 each represent any combination of hardware and programming enabling data to be communicated between router device 10 and a data exchanger such as data exchanger 20A or 20B in FIG. 1. Client interface 30 is shown to include wired interface 34 and wireless interface 36. Wired interface 34 represents generally any interface through which communications can pass between router device 10 and clients 12, 14, and 16 via one or more physical wires. Wired interface 34 may include one or more serial or parallel ports including but not limited to USB and FireWire ports. Wireless interface 36 represents generally any interface through which information can be exchanged between router device 10 and clients 12, 14, and 16 via a wireless protocol such as ultrawideband (UWB), Bluetooth, or 802.11.

Router device 10 also includes connector 38, router 40, remote link manager 42, and web server 44, and memory 46. Connector 38 represents generally any combination of hardware and programming configured to send signals for controlling data exchangers of various types. In the example of FIG. 1, router device 10 utilizes data exchangers 20A and 20B. Data exchangers 20A and 20B may be from different manufactures and may be designed to interact with different data service providers. Thus, connector 38 utilizes different signals for each data exchanger 20A and 20B to achieve the same result. Connector 38 is responsible sending appropriate signals to cause a selected data exchanger to perform a particular task. Such tasks can include establishing a remote link with a data service provider so that access can be made to a wide area network such as internet 26. Other tasks include sending signals to poll a data exchanger for link status information identifying a state of the remote link between the data exchanger and a wide area network.

Where the remote link between a given data exchanger and a corresponding data service provider is wireless, the link status information can identify a signal strength of the remote link and a data transfer rate of the remote link. For a data enabled cellular device, the signal strength is a function of the proximity of the data exchanger and a cell tower or other transceiver with which the data exchanger communicates. Improved signal strength can allow for improved data transfer rates.

Router 40 represents generally any combination of hardware and programming for routing network communication received through client interface 30 to be transmitted by a selected data exchanger to a wide area network such as internet 26. Router 40 is also responsible for routing inbound network communications received from a wide area network and directed via client interface 30 to a specified client 12, 14, or 16. Outbound and inbound network communications, for example can be an IP (internet Protocol) packets directed to a target on a wide area network or to a particular network device 12, 14, or 16 on a local area network.

Figure 4:
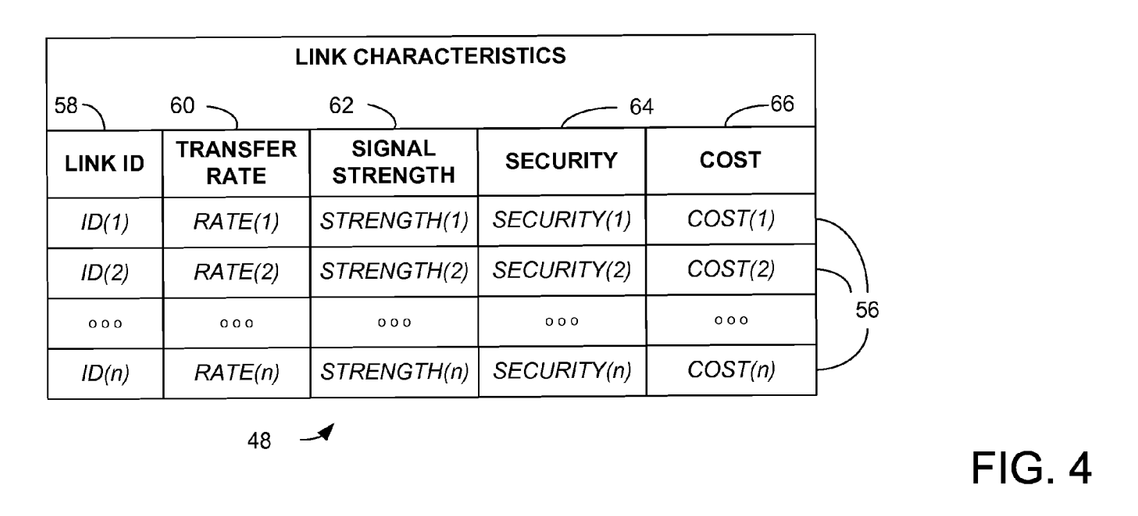
Figure 5:
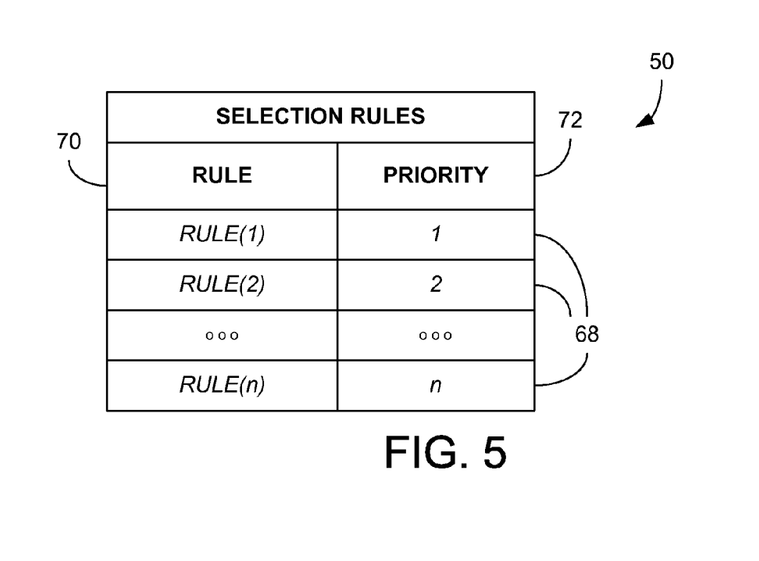

Remote link manager 42, discussed in more detail below with respect to FIGS. 3-5, represents generally any combination of hardware and programming capable of automatically selecting one of a plurality of available data paths over which a router 40 routs data communications to a wide area network. An available data path, as used herein, represents a possible communication path between a data exchanger and a data service provider for that data exchanger. In other words, an available data path represents an existing or possible remote link between a data exchanger and a corresponding data service provider. Remote link manager 42 is then responsible for causing router 40 to route data communications over a remote link between a given data exchanger and a corresponding data service provider where that remote link follows the selected data path. In the example of FIG. 1, router device 10 has three available data paths for routing data communications to a wide area network. Remote link 24C follows one available data path, remote link 24B follows a second, and remote link 24A follows a third.

Web server 44 represents generally any combination of hardware and programming capable of serving interfaces such as web pages to clients 12, 14, and 16. Such web pages may include web pages that when displayed by a network device allows a user to provide or otherwise select settings related to the operation of router device 10.

Memory 46 represents generally one or more computer readable mediums capable of storing data that is accessible to remote link manager 42. As shown memory 46 includes link characteristics 48 and connection rules 52. Link characteristics 48 represents generally a database of link status information that identifies various characteristics of the remote links that may be utilized by router 40 to route data communications to a wide area network. Such characteristics, as discussed with respect to FIG. 4, can include current and average data transfer rates, signal strengths, user account information, data transfer costs, and security details.

Selection rules 50, discussed in more detail below with respect to FIG. 5, represent generally a collection of data representing rules that when processed with link status information can be used to select a data path. Data communications can then be communicated via a remote link that follows that selected data path. For example, one selection rule may indicate that the fastest available data path is to be selected. The fastest available data path can be identified by processing or examining link characteristics 48. Another rule may indicate that the cheapest available data path is to be selected, while another may indicate that the most secure is to be selected. As circumstances cause link characteristics to change, new data paths may be selected from time to time. As an example, the signal strength of a remote link following an initially selected data path may fall below an acceptable level as defined by a selection rule. As a result, a different available data path is selected. That newly selected data path would correspond to a remote link with a stronger signal strength.

FIG. 5 is a block diagram illustrating physical and logical components of remote link manager 42. In this example, remote link manager 44 is shown to include state engine 52 and path selector 54. State engine 52 represents generally any combination of hardware and programming configured to obtain and report link status information. Path selector 54 represents generally any combination of hardware and programming configured to identify available data paths and to process selection rules 50 with link status information reported by state engine 52. Path selector 54 then selects one of a plurality of available data paths according to the processing of the selection rules. As stated above, an available data path represents an existing or possible remote link between a data exchanger and a corresponding data service provider.

The link status information obtained and reported by state engine 52 relate to the status of remote links established or capable of being established between one or more data service providers and one or more data exchangers coupled to router device 10. The link status information can include data identifying past and present data transfer rates, signal strength, security capabilities, data transfer costs, and user account data. The status information can also relate to the type of data that has been or is to be transferred. Such data types can include e-mail, typical browser requests, and larger file transfers of various types via various ports. For example, e-mail is typically exchanged via one port, browser communications through another, and file sharing through yet another. The type of data being transferred can be identified by the port being utilized.

To collect the link status information, state engine 52 is configured to utilize connector 38 to poll data exchangers coupled to router device 10 for information concerning data transfer rates and signal strengths. State engine 52 may also communicate via an established remote link with one or more data service providers to obtain user account data. Such data can include user account information regarding data transfer rates and limits. For example, a user may be entitled to transfer a certain amount of data in a billing period. Additional transfers during that period are charged at a per megabyte rate. In such an example, state engine 52 may obtain data identifying the amount of data already transferred in a given period as well as data identifying any per megabyte costs.

State engine 52 may report collected link status information directly to and at the request of path selector 54. State engine 52 may also report collected link status information by updating link characteristics 48. Path selector 54 may then acquire link status information directly from state manager 52 or by parsing link characteristics 48. In operation, state engine 54 and path selector 54 may perform their respective tasks on a timed schedule. Alternatively, state engine 52 may continually collect and report link status information allowing path selector 54 continually to select an available data path based on the instantaneous state of the link status information.

FIG. 4 is a block diagram depicting an exemplary implementation of link characteristics 48 taking the form of a database of entries 56. Each entry 56 corresponds to a data path that can be followed to establish a remote link between a data service provider and a data exchanger coupled to router device 10. Each entry 56 includes data in a number of fields 58-66. The link ID field of a given entry 56 contains data identifying a particular data path. Transfer rate field 60 of each entry 56 contains data identifying a data transfer rate or rates. The data transfer rate may be an instantaneous and/or average data transfer rate obtained and reported by state engine 52. Signal strength field 62 of each entry 56 contains data identifying a signal strength or strengths. The signal strength may be an instantaneous and/or average signal strength obtained and reported by state engine 52.

Security field 64 of each entry 56 contains data identifying security information. Such security information may identify one or more blocked ports the identity of which was obtained and reported by state engine 52. Cost field 66 of each entry 56 contains data corresponding to the cost of transferring data. For example, such data could include information for determining a per megabyte cost for transferring data. In a given implementation, there may be no additional cost for transferring up to a certain volume of data during a given period of time. Any volume over that limit may be charged at a per megabyte rate. Thus, information in cost field 66 may include a running count of the volume of data transferred in a given period, a volume limit for that period, and a per megabyte rate when that limit is exceeded.

Path selector 54 can then parse link characteristics 58 to identify link status information for an available data path. Remember, an available data path represents a remote link that has or can be established between a data service provider and a data exchanger coupled to router device 10. The link status information can include current and average data transfer rates and current and average signal strengths for each of the available data paths. The link status information can also include, for each available data path, data identifying security and cost considerations.

It is also noted that path selector 54 may communicate directly with state engine 52 requesting the link status information. In response to the request, state engine 52, as described above, may obtain the link status information for path selector by polling data exchangers coupled to router device and/or communication with one or more data service providers via an established remote link.

FIG. 5 is a block diagram depicting an exemplary implementation of selection rules 50 taking the form of a database of entries 68. Each entry 68 includes data in fields 70-72. Rule field 70 of each entry 68 includes data identifying a rule used by path selector 54 to select an available data path. Data in priority field 72 of each entry 68 contains information identifying a priority of the rule identified by that entry 68 with respect to the rules identified by other entries 68. For example, it may be most important that an available data path having security settings that allow the transfer of data of a particular type be selected. For example, certain available data paths might not be compatible with peer to peer file sharing. Thus, such a rule would have first priority. Assuming that the link status information found in link characteristics 48 reveals more than one available data path that can be used to transfer the data, a secondary rule may require the selection of an available data path resulting in the lowest cost for transferring the data. The lowest cost available data path be selected. Assuming that the link status information found in link characteristics 48 reveals more than one available data path that can be used to transfer the data at the lowest cost, a third level rule may require the selection of an available data path having the best signal strength or transfer rate.

Thus, path selector 54 can process selection rules 50 with link status information found in link characteristics 48 to select an available data path. Router 40 can then route data between a local area network and a wide area network via a data exchanger and a remote link that follows the selected data path. If such a remote link is not currently established, path selector 54 can utilize connector 40 to cause a corresponding data exchanger to establish that remote link. In doing so, path selector 54 may also utilize connector 40 to close any other remote links previously being used.

Figure 6:
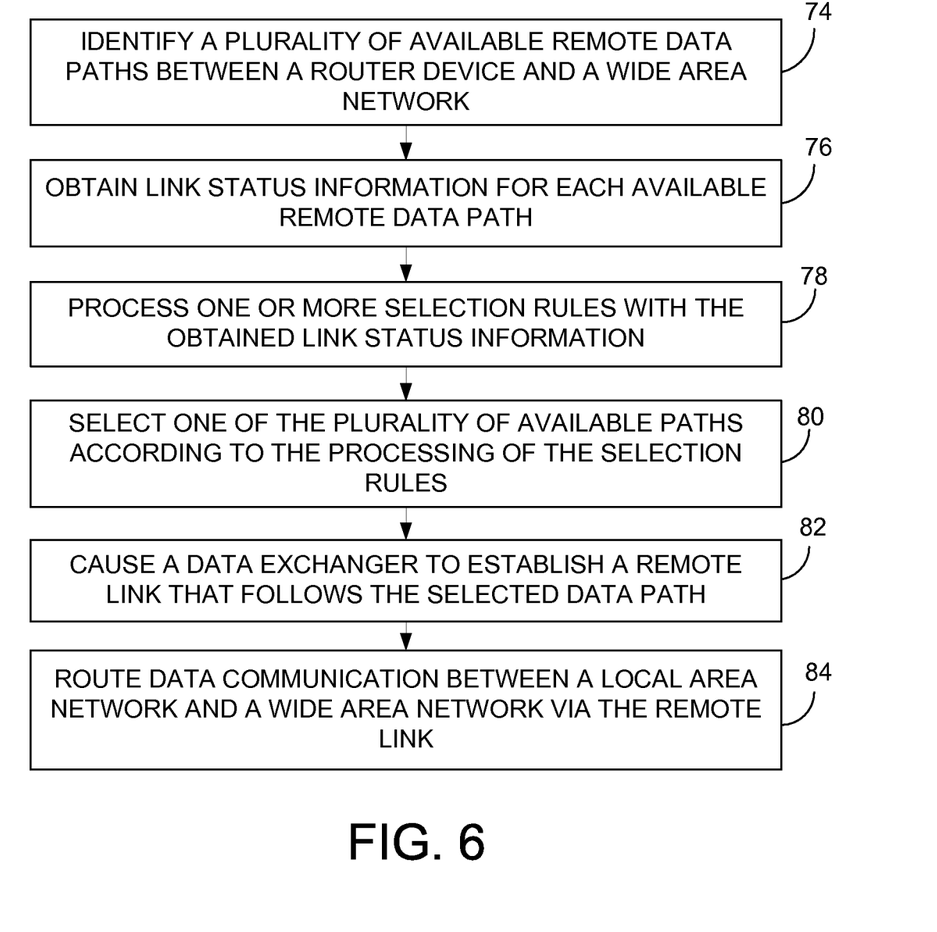
FIG. 6 is an exemplary flow diagrams illustrating steps taken in performance of various embodiments of the present invention.

OPERATION: The operation of embodiments of the present invention will now be described with reference to FIG. 6. FIG. 6 is an exemplary flow diagram that helps illustrate actions taken to select one of a plurality of available data paths. Initially, a plurality of available data paths are identified (step 74). In the Example of FIGS. 2-5, path selector 54 may accomplish step 74 by utilizing connector 38 to communicate with the data exchangers coupled to router device 10 via data exchanger interfaces 32. In doing so, those data exchangers return information identifying the available data paths. Alternatively, link characteristics 48 may include an entry 56 for a number of data paths, not all of which are available at a given point in time. For example, a particular data exchanger may be disconnected from router device 10 and later reconnected. When disconnected, a data path supplied by that data exchanger would not be available. Thus, state engine 52 may maintain link characteristics 48 so that each entry 56 includes a flag or other indicator reflecting that a given data path is an available or an unavailable data path. Path selector 54 could then parse link characteristics 48 to identify the available data paths.

Link status information is then obtained for each available remote data path (step 76). In the example of FIGS. 2-5, state engine 52 may, periodically, or on-demand, poll data exchangers coupled to router device 10 via data exchanger interfaces 32 for the link status information. State engine 52 may then report that information directly to path selector 54 or it may utilize that information to update link characteristics 48. In the later case, path selector 54 would then parse link characteristics 58 for the link status information.

One or more selection rules are then processed with the obtained link status information (step 78). One of the plurality of available data paths is selected according to the processing of the selection rules (step 80). In the example of FIGS. 2-5, path selector 54 accesses and processes selection rules 50 with the link status information obtained in step 76. Path selector 54 then selects a particular data path based on the processing of the selection rules. For example, the selection rules may dictate that the security settings of a selected data path allow the transfer of data of a given type, that the cost of transfer be as low as possible, and the transfer rate be as great as possible. By processing such rules with the link status information, path selector 54 can identify and select a qualified one of the available data paths.

If needed, a corresponding data exchanger is caused to establish a remote link that follows the selected data path (step 82). Data communications are then routed between a local area network and a wide area network via the remote link that follows the selected data path (step 84).

In a particular example, the data path selected in step 80 is a first one of the plurality of available data paths. At a subsequent point in time, updated link status information may be obtained for the available data paths, The selection rules are then processed with the updated link status information and a second one of the plurality of data paths is selected. Data communications can then be routed via a remote link that follows the second data path instead of the first data path. Also, the first remote link following the first data path may be closed in response to the selection of the second data path.

CONCLUSION: The schematic diagrams of FIG. 1 illustrates an exemplary environment in which embodiments of the present invention may be implemented. Implementation, however, is not limited to this environment. The diagrams of FIGS. 2-5 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may also represent in whole or in part a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 6 shows a specific order of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention.

What is claimed is:

1. A method for selecting a data path for connecting one or more client devices to a wide area network, the one or more client devices being connected to a router device via a local area network, the method comprising:
   identifying a plurality of available data paths comprising at least one cellular wireless data path, wherein each of the plurality of available data paths is located between the router device and the wide area network and each of the plurality of available data paths connects the router device to the wide area network, each of the plurality of available data paths being routed via a service provider such that a first of the plurality of available data paths is routed via a first service provider and a second of the plurality of available data paths is routed via a second service provider;
   obtaining link status information for the plurality of available data paths;
   processing selection rules with the obtained link status information;
   selecting one of the plurality of available data paths according to the processing of the selection rules;
   routing data communications between the local area network and the wide area network via a data exchanger and a remote link that follows the selected data path connecting the router device to the wide area network, the client devices being separate from the routing device, wherein the identifying, obtaining, processing, selecting and routing are carried out by the router device; and
   wherein the plurality of available data paths are data paths between the wide area network and one or more data exchangers coupled to the router device and wherein obtaining link status information comprises polling the one or more data exchangers for the link status information.

2. The method of claim 1, wherein the plurality of available data paths are data paths between the wide area network and one or more data exchangers coupled to the router device and wherein obtaining link status information comprises parsing a database of link status information.

3. The method of claim 2, further comprising periodically polling the one or more data exchangers for updated link status information and updating the database with updated link status information received from the one or more data exchangers in response to the polling.

4. The method of claim 1, wherein the selected one of the plurality of available data paths is a first one of the plurality of available data paths, the method further comprising:
   obtaining updated link status information for the available data paths;
   processing selection rules with the obtained updated link status information; and
   selecting a second one of the plurality of available data paths according to the processing of the selection rules with the updated obtained link status information.

5. The method of claim 4, wherein the second one of the plurality of available data paths is different than the first one of the plurality of available data paths.

6. The method of claim 1, further comprising establishing the remote link in response to the selecting of the data path.

7. A non-transitory computer readable medium having instructions thereon that when executed by a router device cause the router device to implement a method, the medium having instructions for selecting a data path for connecting one or more client devices to a wide area network, the one or more client devices being connected to a router device via a local area network, the instructions comprising:

identifying a plurality of available data paths comprising at least one cellular wireless data path, wherein each of the plurality of available data paths is located between the router device and the wide area network and each of the plurality of available data paths connects the router device to the wide area network, each of the plurality of available data paths being routed via a service provider such that a first of the plurality of available data paths is routed via a first service provider and a second of the plurality of available data paths is routed via a second service provider;

obtaining link status information for the plurality of available data paths;

processing selection rules with the obtained link status information;

selecting one of the plurality of available data paths according to the processing of the selection rules;

routing data communications between the local area network and the wide area network via a data exchanger and a remote link that follows the selected data path connecting the router device to the wide area network, the client devices being separate from the router device, wherein the identifying, obtaining, processing, selecting and routing are carried out by the routing device; and wherein the plurality of available data paths are data paths between the wide area network and one or more data exchangers coupled to the router device and wherein the instructions for obtaining link status information include instructions for polling the one or more data exchangers for the link status information.

8. The medium of claim 7, wherein the plurality of available data paths are data paths between the wide area network and one or more data exchangers coupled to the router device and wherein instructions for obtaining link status information include instructions for parsing a database of link status information.

9. The medium of claim 8, having further instructions for periodically polling the one or more data exchangers for updated link status information and updating the database with updated link status information received from the one or more data exchangers in response to the polling.

10. The medium of claim 7, wherein the selected one of the plurality of available data paths is a first one of the plurality of available data paths, the medium having instructions for:

obtaining updated link status information for the available data paths;

processing selection rules with the obtained updated link status information; and selecting a second one of the plurality of available data paths according to the processing of the selection rules with the updated obtained link status information.

11. The medium of claim 10, wherein the second one of the plurality of available data paths is different than the first one of the plurality of available data paths.

12. The medium of claim 7, having further instructions for establishing the remote link in response to the selecting of the data path.

13. A router device, comprising a client interface, a plurality of data exchanger interfaces, a remote link manager, and a router, wherein:

the client interface is configured to connect one or more client devices that are separate from the router device to the router device via a local area network;

each of the plurality of data exchanger interfaces is configured to provide an interface between the router and a data exchanger coupled to that data exchanger interface;

the remote link manager is configured to identify a plurality of available data paths comprising at least one cellular wireless data path, wherein each of the plurality of available data paths is located between the router device and the wide area network and each of the plurality of available data paths connects the router device to a wide area network, each of the plurality of available data paths being routed via a service provider such that a first of the plurality of available data paths is routed via a first service provider and a second of the plurality of available data paths is routed via a second service provider, obtain link status information for the plurality of available data paths, process selection rules with the obtained link status information, and select one of the plurality of available data paths according to the processing of the selection rules;

the router is configured to route data communications between the local area network and the wide area network via a data exchanger and a remote link that follows the selected data path so as to allow a connection between the router and the wide area network; and wherein the plurality of available data paths are data paths between the wide area network and one or more data exchangers coupled to one or more of the plurality of data exchanger interfaces and wherein the remote link manager is configured to poll the one or more data exchangers for the link status information.

14. The router device of claim 13, wherein the plurality of available data paths are data paths between the wide area network and one or more data exchangers coupled to one or more of the plurality of data exchanger interfaces and wherein the remote link manager is configured to parse a database for the link status information.

15. The router device of claim 14, wherein the remote link manager is configured to periodically poll the one or more data exchangers for updated link status information and to update the database with updated link status information received from the one or more data exchangers in response to the polling.

16. The router device of claim 13, wherein the selected one of the plurality of available data paths is a first one of the plurality of available data paths, the remote link manager being configured to:

obtain updated link status information for the available data paths;

process selection rules with the obtained updated link status information; and select a second one of the plurality of available data paths according to the processing of the selection rules with the updated obtained link status information.

17. The router device of claim 16, wherein the second one of the plurality of available data paths is different than the first one of the plurality of available data paths.

18. The router device of claim 13, wherein the wide area network is the internet, and the router device is configured to connect with the internet via a cellular telephone service provider.

19. The router device of claim 18, further comprising an integrated data exchanger that is integrated into the router device.

20. The medium of claim 7, wherein the wide area network is the internet, and the selected data path comprises a cellular telephone service provider network.

21. A method for selecting a data path for connecting one or more client devices to the internet, the one or more client devices being connected to a router device via a local area network, the method comprising:

identifying a plurality of available data paths comprising at least one cellular wireless data path, wherein each of the plurality of available data paths is located between the router device and the wide area network and each of the plurality of available data paths connects the router device to the internet, each of the plurality of available data paths being routed via a service provider such that a first of the plurality of available data paths is routed via a first service provider and a second of the plurality of available data paths is routed via a second service provider;

obtaining link status information for the plurality of available data paths;

processing selection rules with the obtained link status information;

selecting one of the plurality of available data paths according to the processing of the selection rules; and routing data communications between the local area network and the internet via a data exchanger and a remote link that follows the selected data path connecting the router device to the internet, wherein the selected data path comprises a cellular telephone service provider network, wherein the client devices are separate from the router device, and further wherein the identifying, obtaining, processing, selecting and routing are carried out by the router device; and wherein the plurality of available data paths are data paths between the wide area network and one or more data exchangers coupled to the router device and wherein obtaining link status information comprises polling the one or more data exchangers for the link status information.

* * * * *